(12) United States Patent
Fan et al.

(10) Patent No.: US 10,668,648 B2
(45) Date of Patent: Jun. 2, 2020

(54) MOULD FOR MOULDING WIND TURBINE BLADE AND ASSEMBLY OF MOULD

(71) Applicant: Suzhou Red Maple Wind Blade Mould Co., Ltd., Suzhou, Jiangsu (CN)

(72) Inventors: Yiqiang Fan, Jiangsu (CN); Qiang Gao, Jiangsu (CN); Junyu Min, Jiangsu (CN); Xiudong Ying, Jiangsu (CN); Jun Gao, Jiangsu (CN); Rongying Wu, Jiangsu (CN)

(73) Assignee: Suzhou Red Maple Wind Blade Mould Co., Ltd., Jiangsu (CN)

( * ) Notice: Subject to any disclaimer, the term of this patent is extended or adjusted under 35 U.S.C. 154(b) by 433 days.

(21) Appl. No.: 15/326,861

(22) PCT Filed: Jul. 25, 2014

(86) PCT No.: PCT/CN2014/082996
§ 371 (c)(1),
(2) Date: Jan. 17, 2017

(87) PCT Pub. No.: WO2016/011655
PCT Pub. Date: Jan. 28, 2016

(65) Prior Publication Data
US 2017/0210035 A1 Jul. 27, 2017

(51) Int. Cl.
*B29C 33/30* (2006.01)
*B29C 33/38* (2006.01)
(Continued)

(52) U.S. Cl.
CPC .......... *B29C 33/302* (2013.01); *B29C 33/301* (2013.01); *B29C 33/3842* (2013.01);
(Continued)

(58) Field of Classification Search
CPC ... B29C 33/302; B29C 33/3842; B29C 70/06; B29C 33/301; B29C 33/40; Y02P 70/523; B29K 2105/0845; B29L 2031/085
See application file for complete search history.

(56) References Cited

U.S. PATENT DOCUMENTS 4,976,587 A * 12/1990 Johnston ............... B64C 27/473
416/226
5,449,282 A * 9/1995 Brown ................ B29C 45/0416
425/190

(Continued)

FOREIGN PATENT DOCUMENTS

CN 201357535 Y 12/2009
CN 201432382 Y 3/2010
(Continued)

OTHER PUBLICATIONS

Extended European Search Report in EP application 14898037.8 dated Feb. 16, 2018.
(Continued)

*Primary Examiner* — Nahida Sultana
(74) *Attorney, Agent, or Firm* — Polsinelli, PC

(57) ABSTRACT

A mould for moulding a wind turbine blade or an elongate structural part thereof, the mould comprising a plurality of longitudinal elongate mould sections adapted to be fitted together in an end-to-end relationship to form a unitary mould, each mould section having a central mould portion between opposite end portions, each mould section being composed of a fibre reinforced resin matrix composite material, at least one end portion of each mould section forming an integral flange oriented substantially orthogonally downwardly with respect to an upper surface of the mould section, and the upper surface including a moulding surface and a recess located between the flange and the moulding surface, the recess extending across a transverse (Continued)

width of the mould section whereby when the flanges of adjacent mould sections are fitted together in an abutting relationship, the adjacent recesses form a combined recess separating the moulding surfaces of the adjacent mould sections.

6 Claims, 4 Drawing Sheets

(51) Int. Cl.
*B29C 70/06* (2006.01)
*B29C 33/40* (2006.01)
*B29K 105/08* (2006.01)
*B29L 31/08* (2006.01)

(52) U.S. Cl.
CPC .............. *B29C 33/40* (2013.01); *B29C 70/06* (2013.01); *B29K 2105/0845* (2013.01); *B29L 2031/085* (2013.01); *Y02P 70/523* (2015.11)

(56) References Cited

U.S. PATENT DOCUMENTS

| | | | | |
|---|---|---|---|---|
| 5,599,567 A | * | 2/1997 | Gellert | ................ B29C 45/7312 |
| | | | | 264/328.16 |
| 2014/0338815 A1 | * | 11/2014 | Davis | .................... B29C 33/303 |
| | | | | 156/64 |
| 2016/0052173 A1 | * | 2/2016 | Hunter | .................... B29C 70/34 |
| | | | | 416/230 |
| 2016/0177916 A1 | * | 6/2016 | Dent | ...................... F03D 1/0641 |
| | | | | 416/223 R |
| 2017/0274563 A1 | * | 9/2017 | De Waal Malefijt | ... B29C 33/40 |
| 2018/0009177 A1 | * | 1/2018 | Bendel | .................. B29C 66/547 |
| 2018/0345603 A1 | * | 12/2018 | Bech | .................. B29D 99/0028 |
| 2019/0010919 A1 | * | 1/2019 | Nielsen | ................. F03D 1/0675 |
| 2019/0270261 A1 | * | 9/2019 | Randall | ................ B29D 99/001 |
| 2019/0291305 A1 | * | 9/2019 | Hannan | ................... B29C 70/42 |

FOREIGN PATENT DOCUMENTS

| | | |
|---|---|---|
| CN | 102076473 A | 5/2011 |
| CN | 102481704 A | 5/2012 |
| EP | 2357069 A1 | 8/2011 |
| WO | 2009/007077 A1 | 1/2009 |
| WO | 2011006563 A2 | 1/2011 |
| WO | 2011/113432 A1 | 9/2011 |
| WO | 213097859 A2 | 7/2013 |

OTHER PUBLICATIONS

Int'l. Search Report from corresponding Int'l. Appln. No. PCT/CN2014/082996.

Extended European Search Report in corresponding EP Application No. 19194872.8 dated Jan. 14, 2020.

* cited by examiner

MOULD FOR MOULDING WIND TURBINE BLADE AND ASSEMBLY OF MOULD

TECHNICAL FIELD OF THE INVENTION

The present invention relates to a mould for moulding a wind turbine blade or an elongate structural part thereof, and to a method of assembling a mould for moulding a wind turbine blade or an elongate structural part thereof. The present invention particularly relates to such a mould and method which enable the shipping costs of the mould to be reduced without compromising moulding quality during the wind blade production process or mould durability, and while increasing the safety of shipping and reducing the likelihood of inadvertent damage to the mould during shipping. The mould and method have particular application to an electrically heated wind turbine blade mould.

TECHNICAL BACKGROUND OF THE INVENTION

With the development of science and technology, wind power as a safe and green renewable energy has developed rapidly. In recent years, the production technology of wind turbine blades has been continuously developed and improved. Current wind turbine blades typically have a length of more than 50 metres, even up to 70 metres, and are moulded out of fibre reinforced resin composite material.

Accordingly, exceedingly large moulds are required which have a mould surface corresponding to the dimensions of the wind blade to be moulded.

The escalating scale in dimensions of the length, width, height and weight of modern wind turbine blade moulds has made shipping of wind turbine blade moulds much more difficult, with increasing cost and higher risk of damage to the mould. The existing shipping method had reached practical limits of length, height, width and weight of the moulds. With such large mould structures, truck/trailers are unable to make turns on many roads, and the number of available traffic routes for mould transportation by road has become significantly reduced. Still further, the risk of damage to the mould or injury to personnel has increased with increasing mould dimensions. Overall, the transport costs for larger wind turbine blade moulds have become much higher. In addition, typically wind turbine blade moulds have been packaged in waterproof cloth, but this has tended to provide inadequate protection for increasingly large wind blade moulds

AIM OF THE INVENTION

In light of the problems with such existing large wind turbine blade moulds as discussed above, the present invention aims effectively to solve the problems of reliable and efficient transport of the wind blade mould without compromising mould performance or durability during use.

In particular, the present invention aims to provide a safe and cost-effective solution for shipping large scale wind turbine blade moulds.

SUMMARY OF THE INVENTION

The present invention accordingly provides a mould for moulding a wind turbine blade or an elongate structural part thereof, the mould comprising a plurality of longitudinal elongate mould sections adapted to be fitted together in an end-to-end relationship to form a unitary mould, each mould section having a central mould portion between opposite end portions, each mould section being composed of a fibre reinforced resin matrix composite material, at least one end portion of each mould section forming an integral flange oriented substantially orthogonally downwardly with respect to an upper surface of the mould section, and the upper surface including a moulding surface and a recess located between the flange and the moulding surface, the recess extending across a transverse width of the mould section whereby when the flanges of adjacent mould sections are fitted together in an abutting relationship, the adjacent recesses form a combined recess separating the moulding surfaces of the adjacent mould sections.

Optionally, the central mould portion and the flange are connected by a curved region of the fibre reinforced resin matrix composite material forming a continuously curved upper surface from the recess to the flange.

In a preferred embodiment, the mould further comprises heating wires within each mould section, the heating wires extending from the central mould portion into the flange.

Optionally, the mould further comprises an alignment device fitted to each mould section for longitudinally aligning the mould sections to form the unitary mould, the alignment device including a guide element including an opening for aligning a laser beam.

Optionally, the mould further comprises a plurality of assembly devices for assembling together the mould sections to form the unitary mould.

In typical preferred embodiments, the unitary mould has a length of at least 50 metres and at least some of the mould sections have a length of at least 8 metres, and/or the maximum length of each mould section is less than 11.8 metres.

The present invention further provides a method of assembling a mould for moulding a wind turbine blade or an elongate structural part thereof, the method comprising the steps of:
  a. providing a plurality of longitudinal elongate mould sections adapted to be fitted together in an end-to-end relationship to form a unitary mould, each mould section having a central mould portion between opposite end portions, each mould section being composed of a fibre reinforced resin matrix composite material, at least one end portion of each mould section forming an integral flange oriented substantially orthogonally downwardly with respect to an upper surface of the mould section, and the upper surface including a moulding surface and a recess located between the flange and the moulding surface, the recess extending across a transverse width of the mould section;
  b. fitting together the flanges of adjacent mould sections in an abutting relationship, the adjacent recesses form a combined recess separating the moulding surfaces of the adjacent mould sections;
  c. filling the combined recess with a lamination of fibrous material;
  d. locating a mould tool over the fibrous material to define a mould cavity having an upper surface substantially aligned with the moulding surfaces of the adjacent mould sections;
  e. infusing a curable resin into the fibrous material; and
  f. curing the resin to form a fibre reinforced resin matrix composite material bonded to the adjacent mould sections and defining an interconnecting mould surface therebetween.

Optionally, the method further comprises the step, before step c, of disposing a curable resin paste in a vertical gap between the adjacent flanges and wherein the curable resin paste is cured during the curing step f. Typically, the curable resin paste includes metallic particles to provide a thermally conductive material between the adjacent flanges.

Optionally, the method further comprises the step, before step e, of laminating a strap of fibrous material across a lower edge of the adjacent flanges.

Optionally, the central mould portion and the flange are connected by a curved region of the fibre reinforced resin matrix composite material forming a continuously curved upper surface from the recess to the flange.

In preferred embodiments, the method further comprises the step of disposing heating wires within each mould section, the heating wires extending from the central mould portion into the flange.

Optionally, the method further comprises the step of longitudinally aligning the mould sections to form the unitary mould using alignment devices fitted to the mould sections, the alignment devices each including a guide element including a notch or opening for aligning a laser beam.

Typically, the unitary mould has a length of at least 50 metres and at least some of the mould sections have a length of at least 8 metres and/or the maximum length of each mould section is less than 11.8 metres.

The present invention may be utilized for wind turbine blade moulds which are dimensioned, shaped, adapted or configured to function as a main mould or any type of accessory mould for manufacturing a wind turbine blade moulds which requires transportation to a wind turbine blade manufacturing facility.

The preferred embodiments of the present invention can provide a mould structure which is configured to permit the elongate mould to be split into plural sections to enable the individual mould sections to be packaged and shipped separately, with subsequent assembly of the mould sections together when they arrive at the destination at which the mould is to be used in a wind turbine blade moulding process, yet with no compromise to performance or durability of the mould.

The preferred embodiments of the present invention in particular can reduce the size of parts required to be packaged and shipped when shipping a wind turbine blade mould.

When determining the division of the mould dimensions into plural independent mould portions, it is necessary for the dimensions of the mould to be analysed to define successive splitting locations along the longitudinal length of the mould.

In order to increase the safety of shipping, and minimise potential damage to the mould portions, it is preferable to prioritize the splitting size with typical dimensions of shipping containers so that the sections of the mould would be appropriate for container shipping.

In preferred embodiments, a straight line device is provided for assembling the mould parts along a straight line to make sure of maintaining the straightness of different sections after assembling along the longitudinal direction of the assembled mould.

In preferred embodiments, the frame structure of the mould located beneath the moulding surfaces, and the device for mould assembling to ensure a safe connection between the assembled split mould sections, is provided to achieve the required mechanical properties of the mould frame.

The mould structure and assembly process of the preferred embodiments are configured to permit the mould surface to be assembled in order to achieve the requisite mechanical, geometrical and functional properties of the final assembled mould.

In preferred embodiments, the heating wire layout for the connections between the assembled sections is configured to achieve uniformity of heating, comparable to a conventional unitary single-element wind turbine blade mould across its mould surface area.

Overall, the preferred embodiments of the present invention can provide a wind blade mould that, with no compromise to the quality of the moulding surface of or the resultant moulded wind turbine blade, can greatly reduce the difficulty and cost of shipping of a large wind turbine blade mould.

BRIEF DESCRIPTION OF THE DRAWINGS

Embodiements of the present invention will now be described by way of example only, with reference to the accompanying drawings, in which.

DETAILED DESCRIPTION OF THE PREFERRED EMBODIMENTS

Figure 1:
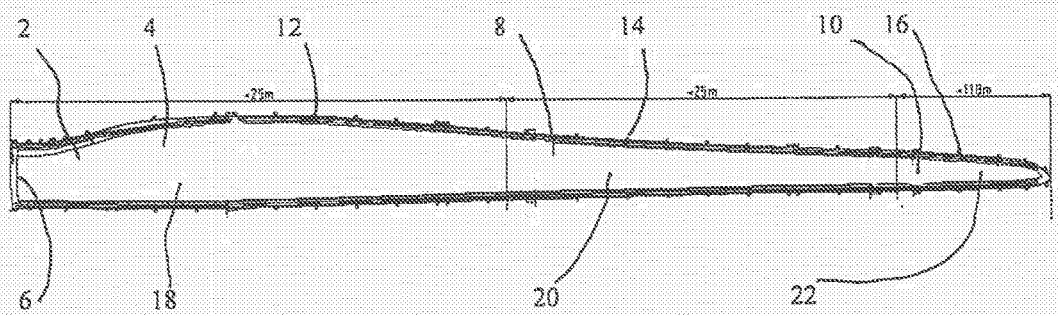
FIG. 1 is a schematic plan view of a wind turbine blade mould according to a first embodiment of the present invention.
Figure 11:
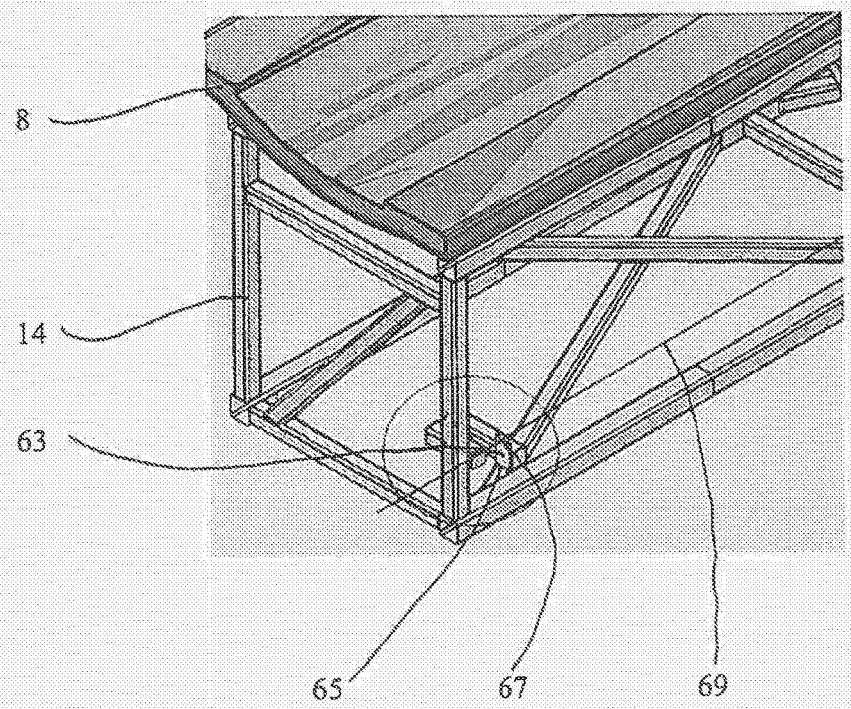
FIG. 11 is a schematic perspective view of a mould section of the mould of FIG. 1 showing an alignment device of a frame carrying a mould section according to a further embodiment of the present invention.

Referring to FIG. 1, there is shown a wind turbine blade mould 2 according to a first embodiment of the present invention. The mould 2 is for moulding an entire wind turbine blade having a length of greater than 60 metres. The mould 2 includes a first section 4, including the blade root 6, a second central section 8 and a third tip section 10. The first and second sections 4, 8 are each less than 25 metres in length whereas the third tip section 10 is less than 11.8 metres in length. Each mould section 4, 6, 10 includes a respective frame section 12, 14, 16 and an associated respective moulding surface 18, 20, 22. Each frame section 12, 14, 16 is constructed of a welded steel structure, with the steel structure being provided with connecting mechanisms, such as bolts, for securely connecting the frame sections 12, 14, 16 together to form a unitary mould 2. FIG. 11 shows, as an example, the mould section 6 carried on the frame section 14.

The length of the sections was selected to facilitate shipping by land by trucks. The tip section 10 could be incorporated into a conventional shipping container.

Figure 2:
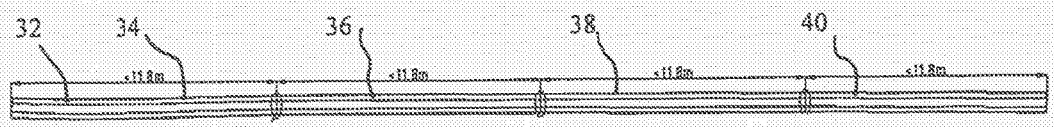
FIG. 2 is a schematic plan view of a mould for moulding a spar cap of a wind turbine blade according to a second embodiment of the present invention.

Referring to FIG. 2, there is shown a wind turbine blade mould 32 according to a second embodiment of the present invention. The mould 32 is for moulding a spar cap of a wind turbine blade. The entire spar cap has a length of less than greater than 47.2 metres. The mould 32 includes four sections 34, 36, 38, 40, each less than 11.8 metres in length so that each section 34, 36, 38, 40 can be fitted into a conventional shipping container. Each mould section 34, 36, 38, 40 includes, as described above for the first embodiment, a respective frame section (not shown) and an associated respective moulding surface.

Figure 3:
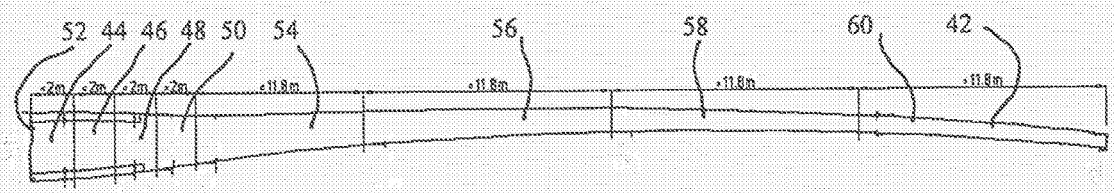
FIG. 3 is a schematic plan view of a mould for moulding a shear web of a wind turbine blade according to a third embodiment of the present invention.

Referring to FIG. 3, there is shown a wind turbine blade mould 42 according to a third embodiment of the present invention. The mould 42 is for moulding a shear web of a wind turbine blade. The entire shear web cap has a length of less than greater than 50 metres. The mould 42 includes four short sequentially adjacent sections 44, 46, 48, 50, to be located at the root end 52, each less than 2 metres in length so that each section 44, 46, 48, 50 can be fitted into a conventional shipping container. The mould 42 also includes four longer sections 54, 56, 58, 60, each less than 11.8 metres in length so that each section 54, 56, 58, 60 can be fitted into a conventional shipping container. Each mould section 44, 46, 48, 50, 54, 56, 58, 60 includes, as described above for the first embodiment, a respective frame section (not shown) and an associated respective moulding surface.

For each of the moulds 2, 32, 42 of FIGS. 1, 2 and 3, the adjacent ends of the abutting mould sections can be assembled and fitted together as described hereinbelow with reference to FIGS. 4 to 11 in order to assemble a unitary mould from the various respective mould sections.

Figure 4:
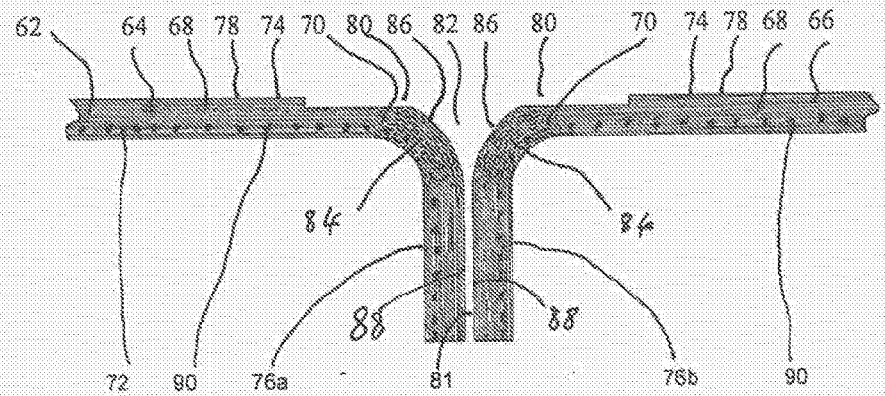
FIG. 4 is a schematic side view of two mould sections of a wind turbine blade mould according to a fourth embodiment of the present invention, the two sections abutting during an initial step of an assembly process for assembling a wind turbine blade mould according to this embodiment of the present invention.

Referring to FIG. 4, there is shown two mould sections of a wind turbine blade mould according to an embodiment of the present invention, the two sections abutting during an initial step of an assembly process for assembling a wind turbine blade mould. The mould 62 is for moulding a wind turbine blade or an elongate structural part thereof. The mould 62 comprises a plurality of longitudinal elongate mould sections 64, 66 fitted together in an end-to-end relationship to form a unitary mould, such as moulds 2, 32 or 42, or any other such mould. Only two such mould sections 64, 66 are shown, but more may be provided as shown in FIGS. 1 to 3.

The mould 62 comprises a plurality of assembly devices, such as bolts (not shown) for assembling together the mould sections 64, 66, for example by bolting together the frame sections as shown in FIG. 1, to form the unitary mould 62. Typically, as shown in FIG. 11, the mould 62 further comprises an alignment device 63 fitted to each mould section 64, 66 for longitudinally aligning the mould sections 64, 66 to form the unitary mould 62. The alignment device 63 includes a guide element 65 including a notch or opening 67 for aligning a laser beam 69.

Each mould section 64, 66 has a central mould portion 68 between opposite end portions 70. Each mould section 64, 66 is composed of a fibre reinforced resin matrix composite material 72 which forms the moulding surface 74, for example glass fibre reinforced epoxy resin. At least one end portion 70 of each mould section 64, 66 forms an integral flange 76 oriented substantially orthogonally downwardly with respect to the upper surface 78 of the mould section 64, 66.

The upper surface 78 includes the moulding surface 74 and a recess 80 located between the flange 76 and the moulding surface 74. The recess 80 extends in a longitudinal direction and also across a transverse width of the mould section 64, 66 whereby when the flanges 76a, 76b of adjacent mould sections 64, 66 are fitted together in a substantially abutting relationship, with typically a vertical gap 81 therebetween, the adjacent recesses 80 form a combined recess 82 separating the moulding surfaces 74 of the adjacent mould sections 64, 66.

The central mould portion 68 and the flange 76 are connected by a curved region 84 of the fibre reinforced resin matrix composite material 72. The curved region 84 forms a continuously curved upper surface 86 from the recess 80 to the flange 76.

The mould further comprises heating wires 90 within each mould section 64, 66. The heating wires 90 extend from the central mould portion 68 into the flange 76 so as to provide substantially uniform heating across the surface area of the unitary moulding surface. The heating wires 4 are preferably located close to the moulding surface 74, for example the embedded wires being from 1 mm to 20 mm, typically from 2 to 10 mm from the moulding surface 74.

In typical preferred embodiments, the unitary mould has a length of at least 50 metres and at least some of the mould sections have a length of at least 8 metres, and/or the maximum length of each mould section is less than 11.8 metres.

Figure 10:
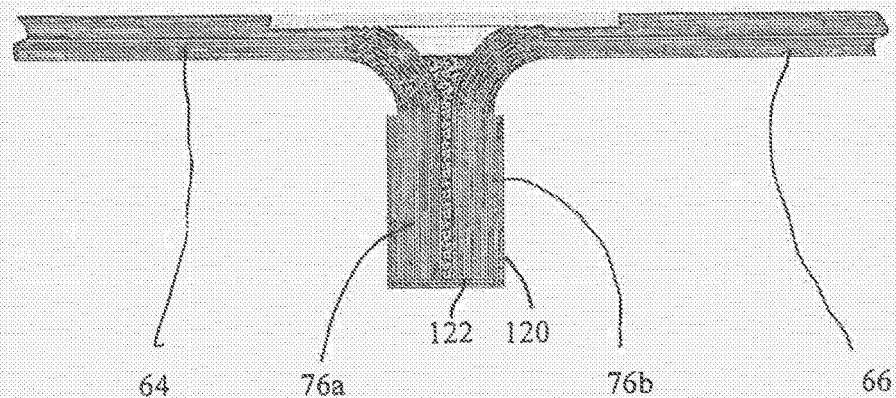
FIG. 10 is a schematic side view of the two mould sections of FIG. 9 with a strap of fibrous material laminated across a lower edge of adjacent flanges of the two abutting sections, which may be applied prior to resin infusion, according to a modified embodiment of the present invention.

Optionally, as shown in FIG. 10, a strap 120 of fibrous material, for example of glass fibre impregnated with a curable resin such as epoxy resin, is laminated across a lower edge 122 of the adjacent flanges 76. This seals the lower edge of any gap between the flanges 76.

Figure 5:
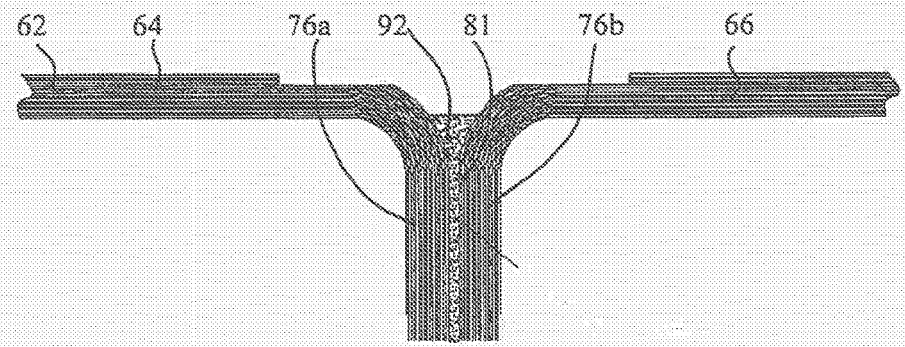
FIG. 5 is a schematic side view of the two mould sections of FIG. 4 after disposing a curable resin paste between the two abutting sections during a subsequent step of the assembly process according to this embodiment of the present invention.

Referirng to FIG. 5, in a next step a curable resin paste 92, for example including a curable epoxy resin and filler material such as silica particles to provide a high paste viscosity, is disposed in the vertical gap 81 between the flanges 76a, 76b of the two abutting sections 64, 66. The resin paste 92 may include metallic particles to provide a thermally conductive material between the adjacent flanges 76a, 76b and thereby increase the thermal conductivity of the connection between the flanges 76a, 76b. The provision of such a thermally conductive material enhances the uniformity of the thermal properties of the mould 62, so that even though the heating wires 90 are longitudinally spaced at the adjacent flanges 76a, 76b the presence of the thermally conductive material conducts heat from the heating wires toward the moulding surface above the cured resin paste, the curing being as discussed below, so as to compensate for the discontinuity of the heating wires at the connections between the mould sections. The delivery of heat to thermally cure the resin material of the wind blade during manufacture is substantially uniform over the surface area of the mould at the connections between the mould sections.

Figure 6:
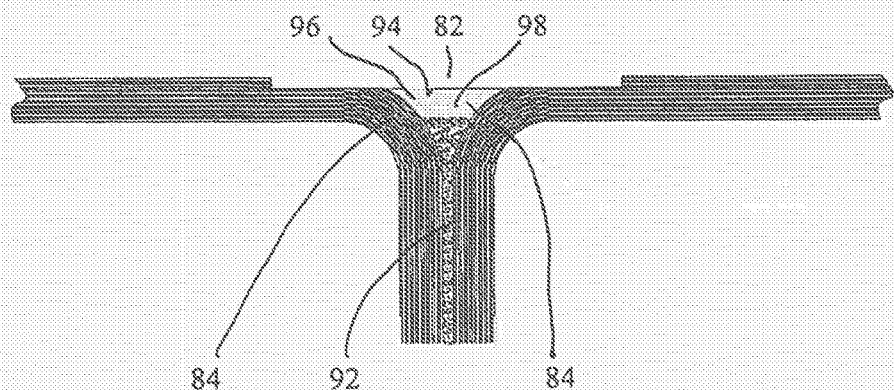
FIG. 6 is a schematic side view of the two mould sections of FIG. 5 after partly filling a combined recess between the lower curved portions of the two abutting sections with a first lamination of fibrous material and curable resin during a subsequent step of the assembly process according to this embodiment of the present invention.
Figure 7:
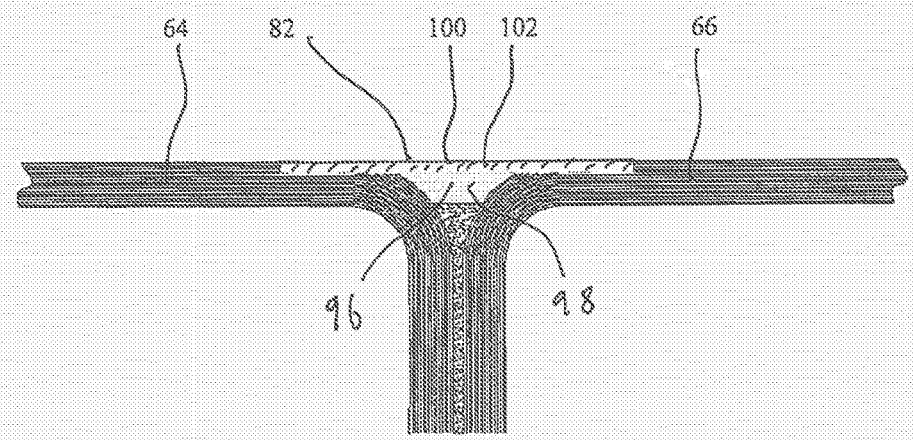
FIG. 7 is a schematic side view of the two mould sections of FIG. 6 after completing the filling of the combined recess between the upper portions of the two abutting sections with a second lamination of fibrous material during a subsequent step of the assembly process according to this embodiment of the present invention.

Subsequently, as shown in FIG. 6, the portion 94 of the combined recess 82 between the lower curved regions 84 above the resin paste 92 is filled with a first lamination of fibrous material 96 and curable resin 98. The fibrous material 96 is typically composed of glass fibres and the curable resin 98 is typically an epoxy resin. This first lamination acts provides a level upper surface and as a plug seal for a subsequent vacuum infusion process, as described below. As shown in FIG. 7, the combined recess 82 between the upper portions of the two abutting sections 64, 66 is then completely filled with a second lamination 100 of fibrous material. Dry fibre mats 102, for example of glass fibre, are laid up into the combined recess 82, so as to level with the moulding surfaces 74. The mats 102 may comprise stitched or woven fabric.

Figure 8:
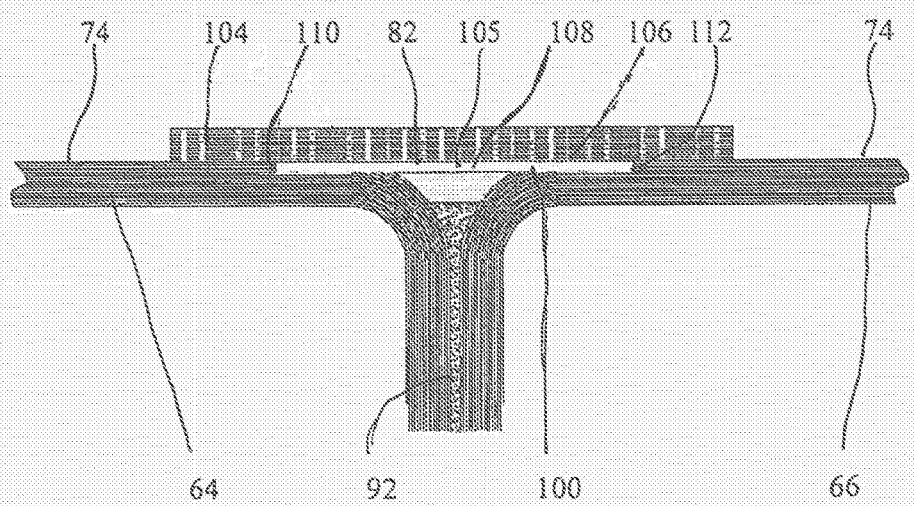
FIG. 8 is a schematic side view of the two mould sections of FIG. 7 after locating a mould tool over the fibrous material to define a mould cavity having an upper surface substantially aligned with the moulding surfaces of the two abutting sections and during resin infusion into the fibrous material in a subsequent step of the assembly process according to this embodiment of the present invention.

Then, as shown in FIG. 8, a mould tool 104 is located over the fibrous material 100 to define a mould cavity 105 containing the dry fibre lamination 100 having an upper surface 106 substantially aligned with the moulding surfaces 74 of the two abutting sections 64, 66. Then a curable resin 108, such as epoxy resin, is infused under vacuum into the fibrous material 100. Typically the infusion point for the resin 108 is at the longitudinal centre of the combined recess 82, so that the resin 108 flows outwardly towards the longitudinal ends 110, 112 of the combined recess 82, and the infusion point may be located at the transverse centre or at a lateral side of the combined recess 82.

Figure 9:
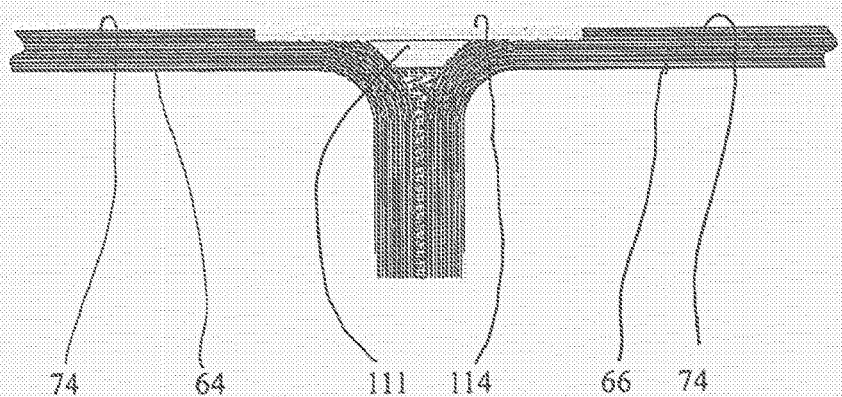
FIG. 9 is a schematic side view of the two mould sections of FIG. 8 after resin infusion, resin curing and removal of the mould tool during a subsequent step of the assembly process according to this embodiment of the present invention.

The curable resins 98, 108 and in the resin paste 92 are then cured at elevated temperature and under vacuum to form a unitary fibre reinforced matrix resin material plug 111 intimately bonded to, and composed substantially of a similar fibre reinforced matrix resin composite material as, the mould sections 64, 66. The resultant plug 111 is shown in FIG. 9. The plug 111 has low surface roughness, which does not require finish sanding because the upper surface 114 of the plug 111 is defined by the mould tool 104, so that the two mould sections 64, 66 are assembled together with a substantially uniform interconnecting moulding surface 114 of the plug 111 substantially indistinguishable from the moulding surfaces 74 of the two mould sections 64, 66.

Although the illustrated embodiment of the present invention employs a wind turbine blade mould, the present invention may be implemented in moulds for moulding other large articles of composite material.

The invention claimed is:

1. A mould for moulding a wind turbine blade or an elongate structural part thereof, the mould comprising: a plurality of longitudinal elongate mould sections adapted to be fitted together in a longitudinal end-to-end abutting relationship to form a unitary mould, each respective mould section of the plurality of mould sections:
   i. having a central mould portion between opposite end portions, at least one of the opposite end portions of the respective mould section forming an integral flange oriented substantially orthogonally downwardly with respect to an upper surface of the respective mould section, the upper surface including a moulding surface and a recess located between the integral flange and the moulding surface, the recess extending across a transverse width of the respective mould section; and
   ii. being composed of a fibre reinforced resin matrix composite material;
   the integral flanges of adjacent ones of the plurality of mould sections being configured to fit together in the longitudinal end-to-end abutting relationship to form respective adjacent mould sections of the unitary mould, and the adjacent recesses of the respective adjacent mould sections being configured to form a combined recess separating the moulding surfaces of the respective adjacent mould sections; and
   an alignment device, fitted to each respective mould section of the plurality of mould sections, for aligning the plurality of mould sections in the longitudinal end-to-end abutting relationship to form the unitary mould, the alignment device including a guide element having a notch or opening for aligning a laser beam.

2. A mould according to claim 1, wherein the central mould portion and the integral flange of each respective mold section are connected by a curved region of the fibre reinforced resin matrix composite material forming a continuously curved portion of the upper surface from the recess to the integral flange.

3. A mould according to claim 1, further comprising heating wires within each respective mould section, the heating wires extending from the central mould portion into the integral flange of the respective mould section.

4. A mould according to claim 1, further comprising a plurality of assembly devices for assembling together the plurality of mould sections to form the unitary mould.

5. A mould according to claim 1, wherein the unitary mould has a length of at least 50 metres and at least some of the plurality of mould sections have a length of at least 8 metres.

6. A mould according to claim 5, wherein the unitary mould has a length of at least 50 metres and the maximum length of each of the plurality of mould sections is less than 11.8 metres.

* * * * *